United States Patent
Mehra

(10) Patent No.: US 10,237,720 B1
(45) Date of Patent: Mar. 19, 2019

(54) INTELLIGENT DATA ROUTING APPLICATION AND METHOD FOR PROVIDING A HOME MOBILE NETWORK OPERATOR WITH A LOCATION OF AN OUTBOUND ROAMER

(71) Applicant: Syniverse Technologies, LLC, Tampa, FL (US)

(72) Inventor: Karan Mehra, Wesley Chapel, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/047,770

(22) Filed: Jul. 27, 2018

Related U.S. Application Data

(60) Provisional application No. 62/550,276, filed on Aug. 25, 2017.

(51) Int. Cl.
| | | |
|---|---|---|
| *H04W 8/08* | (2009.01) | |
| *H04W 4/02* | (2018.01) | |
| *H04W 64/00* | (2009.01) | |
| *H04L 29/08* | (2006.01) | |
| *H04W 8/18* | (2009.01) | |

(52) U.S. Cl.
CPC ............ *H04W 8/08* (2013.01); *H04L 67/28* (2013.01); *H04W 4/025* (2013.01); *H04W 64/003* (2013.01); *H04W 8/18* (2013.01)

(58) Field of Classification Search
None
See application file for complete search history.

(56) References Cited

U.S. PATENT DOCUMENTS

| | | | | |
|---|---|---|---|---|
| 8,009,641 | B2 * | 8/2011 | Grech | H04L 29/12216 370/338 |
| 8,190,149 | B2 * | 5/2012 | Sethi | H04W 36/0011 455/432.1 |
| 8,676,159 | B1 | 3/2014 | Shu et al. | |
| 8,699,472 | B2 * | 4/2014 | Faccinn | H04L 12/14 370/338 |

(Continued)

FOREIGN PATENT DOCUMENTS

WO 2016165752 A1 10/2016

*Primary Examiner* — Candal Elpenord
(74) *Attorney, Agent, or Firm* — Andriy Lytvyn; Smith & Hopen, P.A.

(57) ABSTRACT

A method of enabling a home network to identify a location of its subscriber roaming within a visited network. An Intelligent Data Routing (IDR) application functions as a proxy between a Serving GPRS Support Node (SGSN) of the visited network and a Gateway GPRS Support Node (GGSN) of the home network. The IDR receives a Create PDP Context Request message or an Update PDP Context Request message that is sent from the SGSN to GGSN. The IDR determines whether the Routing Area Identity (RAI) and User Location Information (ULI) Information Elements (IEs) of the Request message have been populated by the SGSN. If the IDR application determines that at least one of these IEs is absent, the IDR application populates them with appropriate values obtained from the SGSN. The routing application sends the modified Request message having the populated RAI and ULI IEs to the GGSN.

19 Claims, 9 Drawing Sheets

(56) References Cited

U.S. PATENT DOCUMENTS

| | | | | |
|---|---|---|---|---|
| 8,825,106 | B2* | 9/2014 | Shaw | H04W 48/20 |
| | | | | 370/310 |
| 9,602,958 | B2* | 3/2017 | Olsson | H04W 4/02 |
| 2002/0101859 | A1* | 8/2002 | Maclean | H04L 29/12009 |
| | | | | 370/352 |
| 2007/0213057 | A1* | 9/2007 | Shaheen | H04W 76/22 |
| | | | | 455/436 |
| 2007/0232301 | A1* | 10/2007 | Kueh | H04W 8/082 |
| | | | | 455/433 |
| 2013/0288644 | A1* | 10/2013 | Schroeder | H04W 12/06 |
| | | | | 455/411 |
| 2016/0295544 | A1* | 10/2016 | Jiang | H04L 5/0053 |

* cited by examiner

INTELLIGENT DATA ROUTING APPLICATION AND METHOD FOR PROVIDING A HOME MOBILE NETWORK OPERATOR WITH A LOCATION OF AN OUTBOUND ROAMER

CROSS-REFERENCE TO RELATED APPLICATIONS

This application claims priority to U.S. Provisional Patent Application No. 62/550,276, entitled "METHOD OF PROVIDING A HOME MOBILE NETWORK OPERATOR WITH LOCATION OF AN OUTBOUND ROAMER," filed Aug. 25, 2017, the entirety of which is incorporated herein by reference.

BACKGROUND OF THE INVENTION

1. Field of the Invention

This invention relates to telecommunications. More specifically, it relates to a method of informing a home network operator about locations of their subscribers while the subscribers are roaming on visited networks.

2. Brief Description of the Related Art

Home mobile network operators have a strong need to know where their subscribers are roaming at any instant in time. This knowledge of the location of each out-bound roaming subscriber is imperative for a number of fundamental operations including tracking, billing, and provision of value added services. Many home networks bill their subscribers for out-bound roaming services using different rates for different countries, and, in some cases, billing rates can vary even within a single country based on the out-bound roamer's location. Without having accurate and current information regarding the locations of the out-bound roaming subscribers, home networks may not be able to bill those subscribers properly.

An effective method of providing a roaming subscriber's information to home network is by using Informational Elements (IEs) of the GTP-C v1 protocol for GSM networks or IEs of the GTP-C v2 protocol for LTE networks. Specifically, Routing Area Identity (RAI) and User Location Information (ULI) IEs can be used to convey the out-bound roamer's location to the home network. The visited network's Serving GPRS Support Node (SGSN) is responsible for populating RAI and ULI IEs. However, because per GSM GTP-C v1 protocol, RAI and ULI IEs are optional, not all SGSNs populate these IEs. When RAI IE, ULI IE, or both are not present in a Create PDP Context Request message or an Update PDP Context Request message, the home network may be unable to identify the roamer's current location.

Accordingly, what is needed is a method of providing information regarding its out-bound roamers' location information to the home network in a consistent and reliable manner. However, in view of the art considered as a whole at the time the present invention was made, it was not obvious to those of ordinary skill in the field of this invention how this objective could be achieved.

SUMMARY OF THE INVENTION

The invention introduces an Intelligent Data Routing (IDR) application. The IDR application functions as a proxy between a Serving GPRS Support Node (SGSN) of a Visited Public Mobile Network (VPMN) and a Gateway GPRS Support Node (GGSN) of a Home Mobile Network HPMN (HPMN). When SGSN sends a Create PDP Context Request message or an Update PDP Context Request message, the IDR receives the Request message first, before it reaches GGSN, and intelligently modifies the Information Elements (IEs) of the Request message as needed. The IDR application uses information obtained from the SGSN to identify the sets of values to be provided in the RAI and ULI IEs. After ensuring that both the RAI and ULI IEs are populated, the IDR sends the modified Request message to GGSN. Thus, the IDR ensures that the Request messages received by GGSN contain both the Routing Area Identity (RAI) IE and the User Location Information (ULI) IE, as these IEs enable the HPMN to identify the location of a User Equipment (UE) roaming within the VPMN.

Upon receiving a Create PDP Context Request message or an Update PDP Context Request message from the SGSN, the IDR determines whether the RAI IE is present in the Request message. If the RAI IE is absent, the IDR populates the RAI IE in the Request message with a first set of values obtained from the SGSN. The IDR uses a Mobile Country Code (MCC), a Mobile Network Code (MNC), a Local Area Code (LAC), and a Routing Area Code (RAC) corresponding to the SGSN to identify the first set of values.

The IDR also determines whether the ULI IE is present in the received Create PDP Context Request message or the Update PDP Context Request message. If the IDR determines that the ULI IE is not present, the IDR populates the ULI IE with a second set of values obtained from the SGSN. In an embodiment, the IDR populates the ULI IE by setting a Geographic Location Type value to reference the RAI IE and, within the Geographic Location Field of the ULI IE, populating the LAC and RAC fields based on the LAC and RAC values assigned to the SGSN.

After the IDR has modified the Create PDP Context Request message or the Update PDP Context Request message such that both RAI and ULI IEs, the IDR sends the modified Request message to the GGSN. Because the modified message contains both the RAI and the ULI IEs, the IDR enables the HPMN to identify the current location of the UE within the VPMN.

In an embodiment, the IDR application is configured to add, update, or delete a predefined IE in a GTP packet transmitted between the SGSN and the GGSN, thereby facilitating compatibility between the HPMN and the VPMN. The GTP packet can be transmitted using GTP-C v1 protocol, GTP-C v2 protocol, or GTP-U v1 protocol.

In an embodiment, the IDR application is used for bilateral roaming or sponsored data roaming. The SGSN can be connected to an Internet Packet Exchange (IPX) network or a Virtual Private Network (VPN) using at least one public Internet Packet (IP) address assigned to the IDR application. In some application, four or more public IP addresses can be used to improve reliability through redundancy.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

The invention enables providing the Home mobile network operator with location of its subscribers roaming on serve networks. The invention also provides a centralized GTP Proxy Service to a Home Mobile Network (HPMN) and a Visited Mobile Network (VPMN).

Figure 1A:
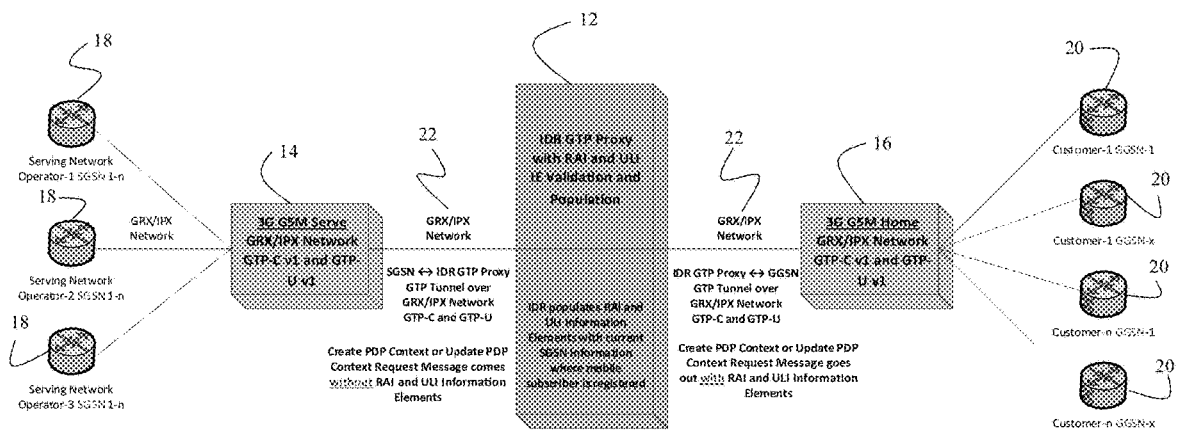
FIG. 1A is a diagram schematically depicting the functionality of the invention when both RAI and ULI IEs are absent in a Create PDP Context Request message or an Update PDP Context Request and are populated by the IDR.

Referring to FIG. 1A, an Intelligent Data Routing (IDR) application 12 is deployed between a VPMN (i.e., 3G GSM Serve) network 14 and a HPMN (i.e., 3G GSM Home) network 16. (The connections between IDR 12 and VPMN 14 and HPMN 16 are described in more detail in the next two sections.) IDR 12 functions as a proxy between Serving GPRS Support Node (SGSN) 18 of VPMN 14 and Gateway GPRS Support Node (GGSN) 20 of HPMN 16. IDR 12 functions as a centralized Proxy Service connecting multiple SGSNs 18 to multiple GGSNs 20 via their connection to Proxy Servers of IDR 12. Thus, IDR 12 provides GPRS Tunneling Protocol Proxy (GTP) service between Home and Serve operators using one logical connection to Proxy Servers of IDR 12. (This disclosure also refers to VPMN 14 as Serve network 14 and refers to HPMN 16 as Home network 16).

IP Connectivity on the Serve Side to/from IDR

Connectivity between IDR 12 and Serve SGSNs 18 is provided via a secure IPX network 22, wherein every SGSN 18 within the wireless network is connected to IPX network 22. IP Addresses assigned to IDR 12 on Serve side 14 are public IP Addresses. In the embodiment in which Serve network 14 is a Sponsored Network Operator, at least four public IP Addresses (published in IR.21 roaming database) are assigned from Sponsored Network Operator to IDR 12. The Sponsored Network Operators have pre-existing Roaming Agreements with Sponsored Operator Network provider and have already provisioned sponsored IP Addresses from their IR.21 roaming database into their SGSNs 18. In other words, SGSNs 18 are preconfigured with the IP Addresses of the Sponsored Operator of Serve network 14. This scheme ensures guaranteed wireless service to mobile subscribers roaming in Sponsored Roaming Partners Networks because these sponsored operator IP Addresses assigned to IDR 12 are already known and provisioned in sponsored roaming partners networks.

Sponsored Operators have pre-existing roaming agreements with their roaming partners. IDR 12 leverages Sponsored Operators' roaming agreements with their roaming partners and enables customers of IDR 12 to roam on the networks of the roaming partner of the Sponsored Operators. In such case, IMSI ranges from IDR 12 customer are mapped to IMSI ranges from a Sponsored Operator of Serve network 14. To IDR 12 customer subscribers roaming in sponsored Serve network 14, roaming partner Serve network 14 appears to belong to the Sponsored Operator. IDR 12 provides IMSI mapping between sponsored Serve networks 14 and customer Home networks 16 and acts as a GTP Proxy between customer and sponsored network roaming partners. IDR 12 can also be used as GTP Proxy between operators where no IMSI mapping is required.

IP Connectivity on the Home Side to/from IDR

Connectivity between IDR 12 and GGSNs 20 of Home network 16 is provided through secure IPX network 22 (or VPN) using the at least one public internet IP Addresse assigned to IDR 12. In some application it may be preferable to use four or more IP addresses to facilitate reliability through redundancy. In an embodiment, IDR 12 has scalable Active-Active architecture with geo redundancy and on-site redundancy, with two active IDR Servers on each site and one on standby. More IDR servers can be added as needed depending upon traffic load.

Providing Home Network with Location of Outbound Roamers

IDR 12 is configured to provide Home network 16 with information that would enable Home network 16 to establish locations of its outbound roamers. IDR 12 achieves this functionality by populating Routing Area Identity (RAI) and User Location Information (ULI) Information Elements (IE) in GTP-C v1 protocol. RAI and ULI IEs are optional fields in GTP-C v1 protocol and, therefore, are not always populated by all SGSNs 18. When the parameters within RAI and ULI IEs are reported to Home network 16, Home network 16 can identify the location of the out-bound subscriber within the Visited network 14. However, because per GSM GTP-C v1 protocol, the RAI and ULI IEs are optional IEs, there may be inconsistencies in what IEs Serve network 14 provides to the Home network 16. When sending a Create PDP Context Request or an Update PDP Context Request messages, Serve network 14 operators may include only one of these IEs or may not include them at all.

The RAI and ULI IE are specified in 3GPP TS 29.060 [4] and are discussed in more detail below.

Details on RAI and ULI IE:

RAI IE is defined as:

| Octets/Bits | 8 | 7 | 6 | 5 | 4 | 3 | 2 | 1 |
|---|---|---|---|---|---|---|---|---|
| 1 | | | Type = 152 (Decimal) | | | | | |
| 2 | | MCC Digit 2 | | | | MCC Digit 1 | | |
| 3 | | MNC Digit 3 | | | | MCC Digit 3 | | |
| 4 | | MNC Digit 2 | | | | MNC Digit 1 | | |
| 5-6 | | | | LAC | | | | |
| 7 | | | | RAC | | | | |

The RAI IE includes values provided within a Mobile Country Code (MCC) and a Mobile Network Code (MNC) of SGSN 18, with which the outbound roamer is registered. The MCC is a country code assigned to the country to which Serve network 14 belongs. MNC identifies the specific Serve network 14 to which the Mobile Switching Center (MSC) node belongs. The MNC values are defined by the national regulators.

The RAI IE further includes Local Area Code (LAC) and Routing Area Code (RAC) components. The LAC identifies a group of cells (the location area) within a Visited Location Register (VLR) service area. The RAC identifies a location in the Serve Network for Packet Switched (PS) connectivity.

ULI IE is defined as follows:

| Octets/Bits | 8 | 7 | 6 | 5 | 4 | 3 | 2 | 1 |
|---|---|---|---|---|---|---|---|---|
| 1 | | | | Type = 3 (Decimal) | | | | |
| 2-3 | | | | Length | | | | |
| 4 | | | | Geographic Location Type | | | | |
| 5-m | | | | Geographic Location | | | | |

The Geographic Location Type within the ULI IE is defined as follows:

| Value | Definition |
|---|---|
| 0 | Geographic Location field included and it holds the Cell Global Identification (CGI) of where the user is currently registered. |
| 1 | Geographic Location field included and it holds the Service Area Identity (SAI) of where the user is currently registered. |
| 2 | Geographic Location field included and it holds the Routing Area Identification (RAI) of where the user is currently registered. |

As the above table shows, the "Geographic Location" field within the ULI IE can include the Cell Global Identity (CGI) and/or Service Area Identification (SAI), depending on whether the UE is in a cell or a service area respectively. The CGI identifies the cell where the subscriber was registered at the time of the most recent radio contact between the UE and the MSC. The SAI is a combination of MCC, MNC, LAC, and SAC.

The Geographic Location Field within ULI IE when Type=0 (for CGI) is defined as:

| Octets/Bits | 8 | 7 | 6 | 5 | 4 | 3 | 2 | 1 |
|---|---|---|---|---|---|---|---|---|
| 5 | | MCC Digit 2 | | | | MCC Digit 1 | | |
| 6 | | MNC Digit 3 | | | | MCC Digit 3 | | |
| 7 | | MNC Digit 2 | | | | MNC Digit 1 | | |
| 8-9 | | | | LAC | | | | |
| 10-11 | | | | CI | | | | |

The Geographic Location Field within ULI IE when Type=1 (for SAI) is defined as:

| Octets/Bits | 8 | 7 | 6 | 5 | 4 | 3 | 2 | 1 |
|---|---|---|---|---|---|---|---|---|
| 5 | | MCC Digit 2 | | | | MCC Digit 1 | | |
| 6 | | MNC Digit 3 | | | | MCC Digit 3 | | |
| 7 | | MNC Digit 2 | | | | MNC Digit 1 | | |
| 8-9 | | | | LAC | | | | |
| 10-11 | | | | SAC | | | | |

The Geographic Location Field within ULI IE when Type=2 (for RAI) is defined as:

| Octets/Bits | 8 | 7 | 6 | 5 | 4 | 3 | 2 | 1 |
|---|---|---|---|---|---|---|---|---|
| 5 | | MCC Digit 2 | | | | MCC Digit 1 | | |
| 6 | | MNC Digit 3 | | | | MCC Digit 3 | | |
| 7 | | MNC Digit 2 | | | | MNC Digit 1 | | |
| 8-9 | | | | LAC | | | | |
| 10-11 | | | | RAC | | | | |

Note:
If only two digits are included in the MNC, then bits 5 to 8 of octet 6 are coded as "1111".

Four Scenarios with Respect to Inclusion/Exclusion of RAI and ULI IEs

IDR 12 is configured to ensure that both the RAI and ULI IEs are always populated. FIGS. 1-4 depict four possible scenarios with respect to IDR 12 populating the ULI and RAI IEs.

First Scenario: Both RAI and ULI IEs are Absent

Figure 1B:
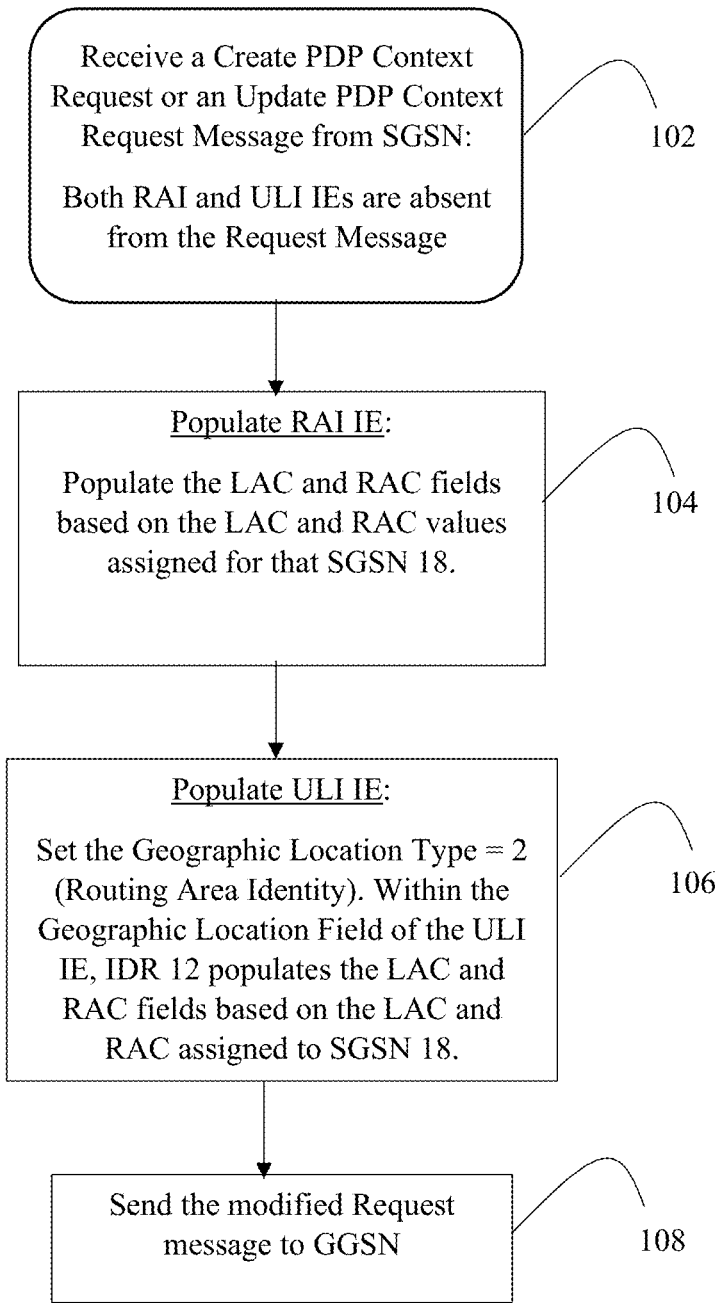
FIG. 1B is a flowchart depicting the functionality of the invention both RAI and ULI IEs are absent in a Create PDP Context Request message or an Update PDP Context Request and are populated by the IDR.

In the first scenario, depicted in FIGS. 1A and 1B, IDR 12 receives, from SGSN, a Create PDP Context or an Update PDP Context Request message without ULI and RAI IEs in step 102 (FIG. 1B). When neither RAI nor ULI IE is present, and the received IP address of SGSN 18 matches the provisioned sponsored or global SGSN IP Address, IDR 12 adds the RAI and ULI IEs by populating them with the values provided in the LAC, RAC, MCC, and MNC associated with that SGSN 18.

IDR 12 populates the ULI and RAI IEs in this scenario as follows:

RAI IE: In step 104, IDR 12 populates the LAC and RAC fields based on the LAC and RAC values assigned for that SGSN 18 (or predefined values).

ULI IE: In step 106, IDR 12 sets the Geographic Location Type=2 (Routing Area Identity). Also, within the Geographic Location Field of the ULI IE, IDR 12 populates the LAC and RAC fields based on the LAC and RAC assigned to SGSN 18 (or predefined values).

After both the ULI and RAI IEs have been populated, IDR 12 sends the modified Request message containing the ULI and RAI IEs to GGSN 20 in step 108.

Second Scenario: ULI IE is Present, RAI IE is Absent

Figure 2A:
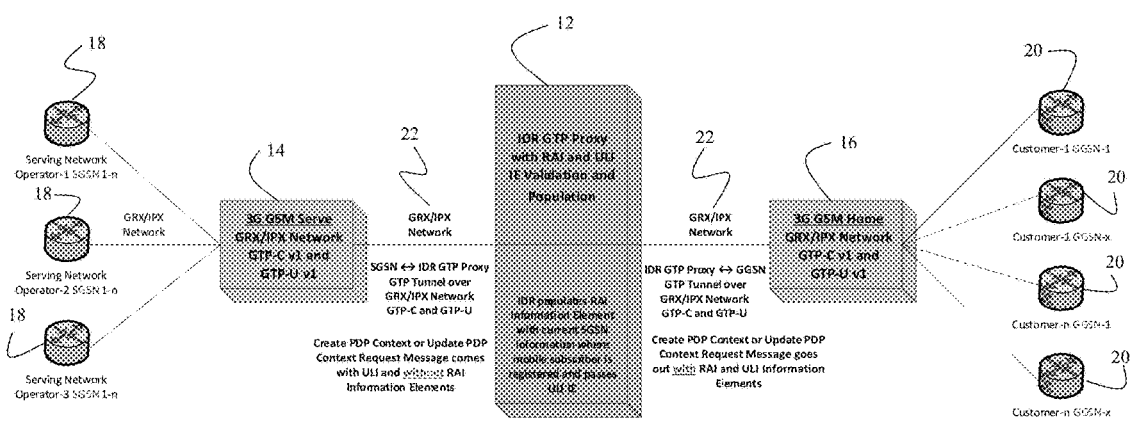
FIG. 2A is a diagram schematically depicting the functionality of the invention when the ULI IE is present in a Create PDP Context Request message or an Update PDP Context Request, but the RAI IE is absent and is populated by the IDR.
Figure 2B:
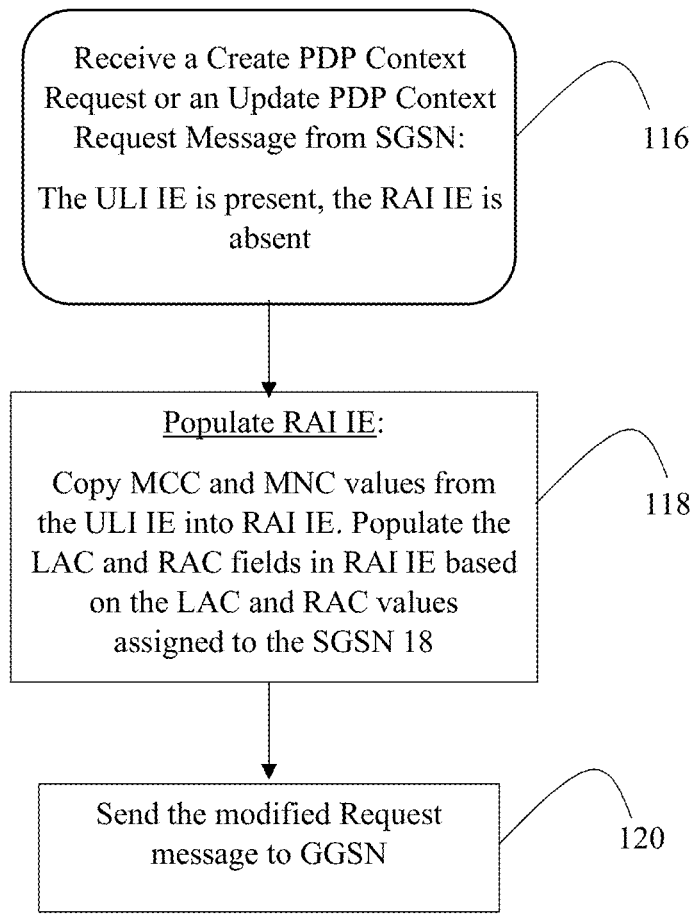
FIG. 2B is a flowchart depicting the functionality of the invention when the ULI IE is present in a Create PDP Context Request message or an Update PDP Context Request, but the RAI IE is absent and is populated by the IDR.

In the second scenario, depicted in FIGS. 2A and 2B, the Request message sent from SGSN 18 has a ULI IE, but the RAI IE is not present. Referring to FIG. 2B, IDR 12 receives this message in step 116. In this scenario, IDR 12 does not change the ULI IE populated by SGSN 18. IDR 12 only populates the RAI IE, which involves the following steps:

RAI IE: In step 118, IDR 12 copies MCC and MNC values from the ULI IE into RAI IE. IDR 12 populates the LAC and RAC fields in RAI IE based on the LAC and RAC values assigned to the SGSN 18 (or predefined values).

After populating the RAI IE, IDR 12 sends the modified Request message to the GGSN 20 in step 120.

Third Scenario: RAI IE is Present, ULI IE is Absent

Figure 3A:
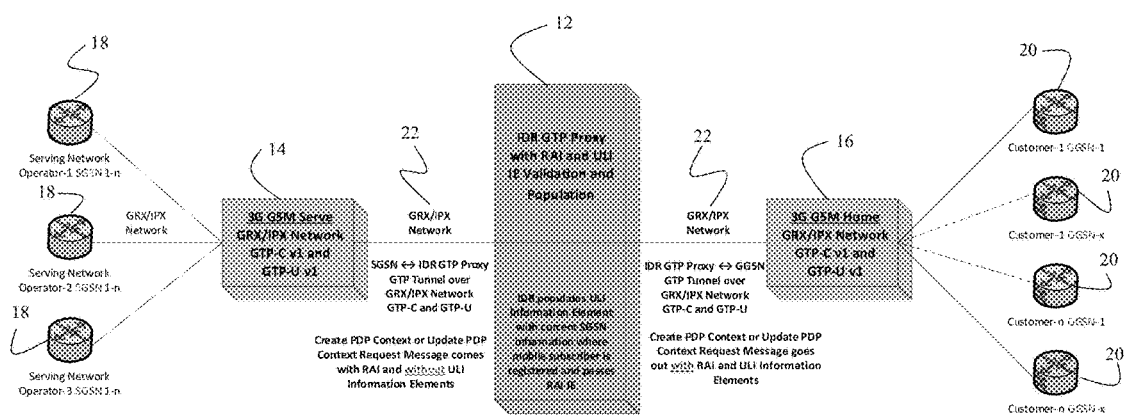
FIG. 3A is a diagram schematically depicting the functionality of the invention when the RAI IE is present in a Create PDP Context Request message or an Update PDP Context Request, but the ULI IE is absent and is populated by the IDR.
Figure 3B:
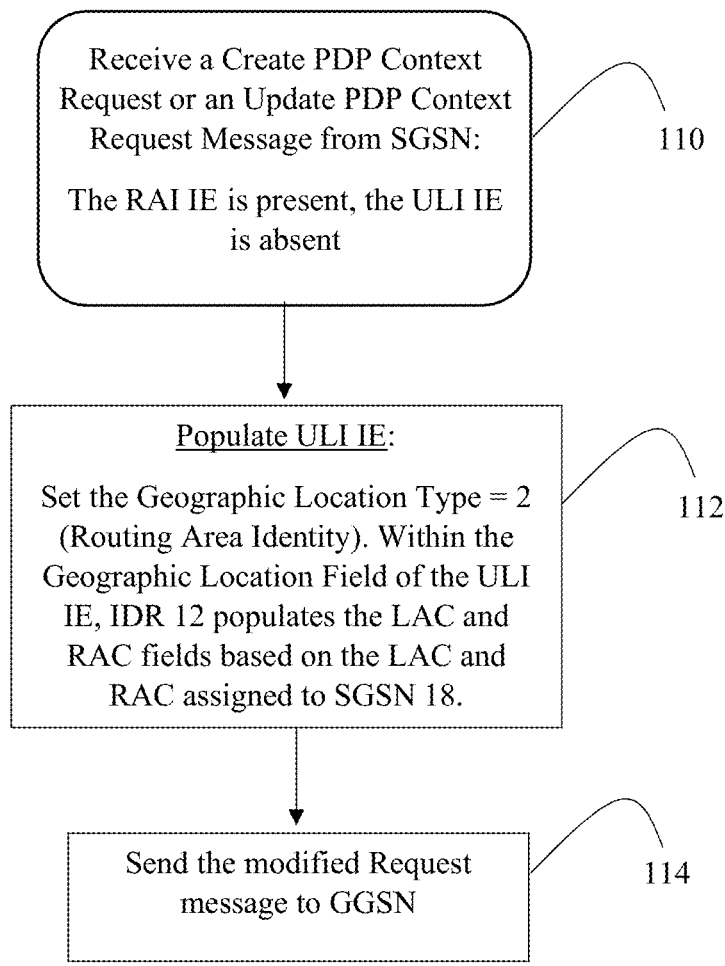
FIG. 3B is a flowchart depicting the functionality of the invention when the RAI IE is present in a Create PDP Context Request message or an Update PDP Context Request, but the ULI IE is absent and is populated by the IDR.

FIGS. 3A and 3B depict the third scenario, in which SGSN 18 populates the RAI IE, but does not include the ULI IE. Referring to FIG. 3B, IDR 12 receives such Request message in step 110. In this scenario, IDR 12 populates the ULI IE using information obtained from SGSN 18, but does not change the RAI IE, which is populated by SGSN 18.

ULI IE: In step 112, IDR 12 sets Geographic Location Type value of ULI IE to 2 (Routing Area Identity). Within the Geographic Location Field of the ULI IE, IDR 12 populates the MCC and MNC values provided within RAI IE and populates the LAC and RAC fields with the LAC and RAC values assigned to SGSN 18 (or predefined values).

After populating the ULI IE, IDR 12 sends the modified Request message to the GGSN 20 in step 114.

Fourth Scenario: Both the RAI and the ULI IEs are Populated by SGSN

Figure 4A:
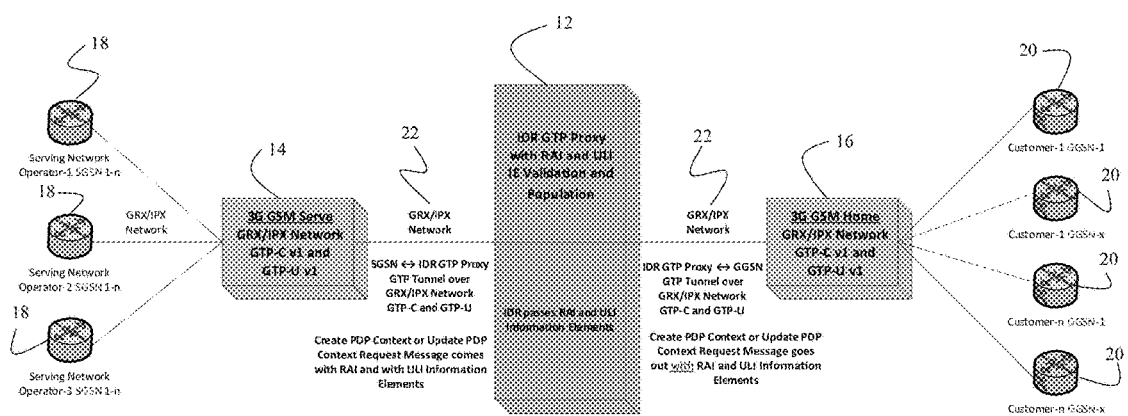
FIG. 4A is a diagram schematically depicting the functionality of the invention when both the RAI or the ULI IEs are present in a Create PDP Context Request message or an Update PDP Context Request, and the IDR passes the unmodified message to the GGSN.
Figure 4B:
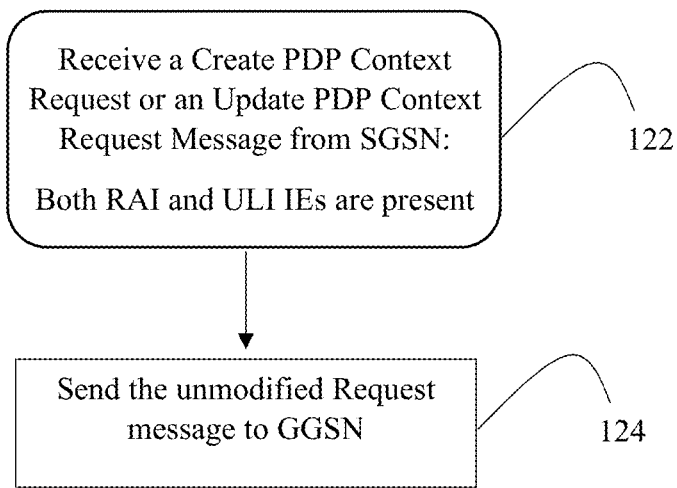
FIG. 4B is a flowchart depicting the functionality of the invention when both the RAI or the ULI IEs are present in a Create PDP Context Request message or an Update PDP Context Request, and the IDR passes the unmodified message to the GGSN.

In the fourth scenario, depicted in FIGS. 4A and 4B, SGSN 18 populates both the RAI and the ULI IEs within the Request message. Referring to FIG. 4B, IDR 12 receives the Request message in step 122. As FIGS. 4A and 4B illustrate, when both RAI and ULI IEs of the Request message are populated by SGSN 18, IDR 12 simply passes the Request message along to GGSN 20 in step 124, without making any changes to the IEs.

Figure 5:
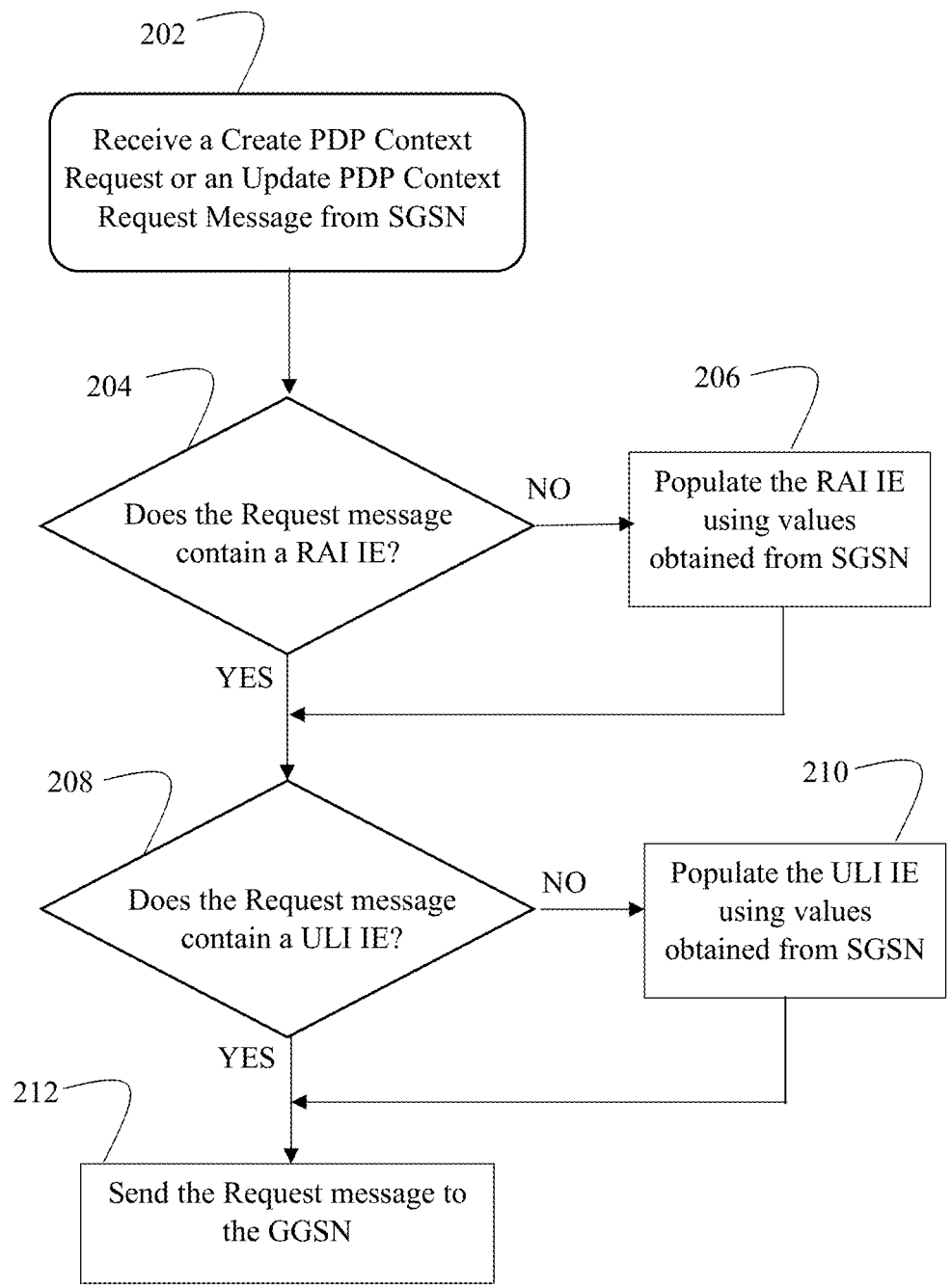
FIG. 5 is a flowchart depicting the operation of an Intelligent Data Routing (IDR) application.

FIG. 5 is a flowchart depicting the logic utilized by IDR 12 applicable to all four scenarios described above. In step 202, IDR 12 receives a Create PDP Context or the Update PDP Context Request message originating from SGSN 18 of Serve network 14. In step 204, IDR 12 checks the Request message to determine whether the RAI IE is populated. If IDR 12 determines that the RAI IE is absent, IDR 12 proceeds to step 206, in which IDR 12 populates the RAI IE. In step 208, IDR 12 checks the Request message to determine whether the ULI IE is present. If the ULI is not present, IDR 12 proceeds to step 210, in which IDR 12 populates the ULI IE. In step 212, IDR 12 sends the modified Request message to GGSN 20 of Home network 16. Thus, if one or both of these IEs are not present, IDR 12 automatically populates the missing IE with the appropriate values obtained from SGSN 18 of Serve network 14 and sends the modified Request message to GGSN 20 of Home network 16.

Additional Advantages of IDR 12

IDR 12 can be used for bilateral roaming and Sponsored Data Roaming. Note: GTP Protocol is used in GSM (GTP v1) and LTE (GTP v2) for Data Signaling. As part of GTP Proxy Service, every GTP Packet sent from SGSN 18 of Serve network 14 to GGSN 20 of Home network 16 traverses through IDR 12. Thus, IDR 12 has a capability of adding, updating, or deleting any IE in GTP-C v1 protocol (used in 3G) and GTP-C v2 protocol (used in 4G LTE) data roaming. IDR 12 is also capable of adding, updating, or deleting any IE in GTP-U v1 protocol, which is used for actual user data in 3G GSM and 4G LTE. (Note-1: GTP-C Protocol is used in GSM (GTP-C v1) and LTE (GTP-C v2) for Data Signaling. Note-2: GTP-U Protocol is used in GSM (GTP-U v1) and LTE (GTP-U v1) for User Data.)

Because IDR 12 has a capability to add, update, and delete IEs in GTP packet, IDR 12 has an ability to modify the GTP Packet to ensure compliance with the requirements of Home network 16. For example, some Home networks 16 may not support certain IEs in specific GTP packets. The "delete" capability allows the IDR 12 to delete the unsupported IEs before the GTP packet reaches GGSN 20, thereby enabling communications between Serve network 14 and Home network 16 to work. Some networks may expect certain IEs in specific GTP packets that are not populated by other side. The "add" capability allows IDR 12 to populate the required IEs with predefined values before the GTP packet reaches the destination network. Moreover, some networks may support only specific values for certain IEs in certain GTP packets. The "update" feature allows IDR 12 to update the required IEs prior to the GTP packet reaching the network.

The RAI and ULI IEs can be populated as part of Sponsored Data Roaming Service where roaming is done through a Sponsor. IDR 12 has information about every SGSN 18 in Sponsor Roaming Network and populates the RAI and ULI IEs based on SGSN 18 in which the subscriber is currently registered. In an embodiment, IDR 12 uses the IP address of SGSN 18 to determine the location information to be provided in the RAI and ULI IEs.

| Abbreviations: | |
| --- | --- |
| 3G | $3^{rd}$ Generation |
| 4G | $4^{th}$ Generation |
| IDR | Intelligent Data Routing |
| LTE | Long Term Evolution |
| SGSN | Serving GPRS Support Node |
| GGSN | Gateway GPRS Support Node |
| IE | Information Element |
| HPMN | Home Public Mobile Network (also referred to herein as Home network) |
| VPMN | Visited Public Mobile Network (also referred to herein as Serve network) |
| MCC | Mobile Country Code |
| MNC | Mobile Network Code |
| LAC | Local Area Code |
| RAC | Routing Area Code |
| CGI | Cell Global Identity |
| SAI | Service Area Identification |
| SGW | Serving Gateway |
| PGW | PDN (Packet Data Network) Gateway |
| GTP | GPRS Tunneling Protocol |
| GTP-C | GTP Control Plane |
| GTP-U | GTP User Plane |
| GPRS | General Packet Radio Service |
| RAI | Routing Area Identity (Information Element) |
| ULI | User Location Information (Information Element) |
| GSM | Global System for Mobile Communication |
| V1 | Version 1 |
| V2 | Version 2 |

HARDWARE AND SOFTWARE INFRASTRUCTURE EXAMPLES

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of enabling a Home Mobile Network (HPMN) to identify a location of a User Equipment (UE) roaming within a Visited Mobile Network (VPMN), comprising:
    providing an Intelligent Data Routing (IDR) application, wherein the IDR application functions as a proxy between a VPMN Serving GPRS Support Node (SGSN) and a HPMN Gateway GPRS Support Node (GGSN), the IDR application being configured to execute the steps comprising:
        receiving a Create PDP Context Request message or an Update PDP Context Request message from the SGSN;
        determining whether the Routing Area Identity (RAI) Information Element (IE) is present in the Create PDP Context Request message or the Update PDP Context Request message;
        responsive to the RAI IE being absent, populating the RAI IE of the Create PDP Context Request message or the Update PDP Context Request message with a first set of values obtained from the SGSN;
        determining whether the User Location Information (ULI) IE is present in the Create PDP Context Request message or the Update PDP Context Request message;
        responsive to the ULI IE being absent, populating the ULI IE of the Create PDP Context Request message or the Update PDP Context Request message with a second set of values obtained from the SGSN; and
        sending the Create PDP Context Request message or the Update PDP Context Request message with populated RAI and ULI IEs to the GGSN, thereby enabling the HPMN to identify a current location of the UE within the VPMN.

2. The method of claim 1, wherein a Mobile Country Code (MCC), a Mobile Network Code (MNC), a Local Area Code (LAC), and a Routing Area Code (RAC) corresponding to the SGSN are used to identify the first set of values.

3. The method of claim 1, wherein the step of populating the ULI IE with the second set of values comprises setting a Geographic Location Type value to reference the RAI IE and, within a Geographic Location Field of the ULI IE, populating LAC and RAC fields based on LAC and RAC values assigned to the SGSN.

4. The method of claim 1, wherein the IDR application is configured to add, update, or delete a predefined IE in a GTP packet transmitted between the SGSN and the GGSN.

5. The method of claim 4, wherein the GTP packet is transmitted using GTP-C v1 protocol, GTP-C v2 protocol, or GTP-U v1 protocol.

6. The method of claim 1, wherein the IDR application is used for bilateral roaming or sponsored data roaming.

7. The method of claim 1, wherein the SGSN is connected to an Internet Packet Exchange (IPX) network or a Virtual Private Network (VPN).

8. The method of claim 1, wherein connectivity between the IDR application and the GGSN is provided through an IPX network or a VPN using at least one public Internet Packet (IP) address assigned to the IDR application.

9. The method of claim 1, wherein the IDR application uses an IP address of the SGSN to identify the first or the second set of values to be provided in the RAI and ULI IEs.

10. A non-transitory computer-readable storage medium comprising computer-readable instructions which, when executed by one or more processors, cause the one or more processors to:
receiving a Create PDP Context Request message or an Update PDP Context Request message from a Serving GPRS Support Node (SGSN) of a Visited Public Mobile Network (VPMN);
determining whether the Routing Area Identity (RAI) Information Element (IE) is present in the Create PDP Context Request message or the Update PDP Context Request message;
responsive to the RAI IE being absent, populating the RAI IE of the Create PDP Context Request message or the Update PDP Context Request message with a first set of values obtained from the SGSN;
determining whether the User Location Information (ULI) IE is present in the Create PDP Context Request message or the Update PDP Context Request message;
responsive to the ULI IE being absent, populating the ULI IE of the Create PDP Context Request message or the Update PDP Context Request message with a second set of values obtained from the SGSN; and
sending the Create PDP Context Request message or the Update PDP Context Request message with populated RAI and ULI IEs to a Gateway GPRS Support Node (GGSN) of a Home Public Mobile Network (HPMN), thereby enabling the HPMN to identify a current location of a User Equipment (UE) roaming within a Visited Mobile Network (VPMN).

11. The non-transitory computer-readable storage medium of claim 10, wherein a Mobile Country Code (MCC), a Mobile Network Code (MNC), a Local Area Code (LAC), and a Routing Area Code (RAC) corresponding to the SGSN are used to identify the first set of values.

12. The non-transitory computer-readable storage medium of claim 10, wherein the step of populating the ULI IE with the second set of values comprises setting a Geographic Location Type value to reference the RAI IE and, within a Geographic Location Field of the ULI IE, populating LAC and RAC fields based on LAC and RAC values assigned to the SGSN.

13. The non-transitory computer-readable storage medium of claim 10, wherein the step of populating the ULI IE with the second set of values comprises setting a Geographic Location Type value to reference the RAI IE and populating LAC and RAC fields of the RAI IE using the LAC and the RAC values of the SGSN or a set of predefined values.

14. The non-transitory computer-readable storage medium of claim 10, wherein the IDR application is configured to add, update, or delete a predefined IE in a GTP packet transmitted between the SGSN and the GGSN.

15. The non-transitory computer-readable storage medium of claim 14, wherein the GTP packet is transmitted using GTP-C v1 protocol, GTP-C v2 protocol, or GTP-U v1 protocol.

16. The non-transitory computer-readable storage medium of claim 10, wherein the IDR application is used for bilateral roaming or sponsored data roaming.

17. The non-transitory computer-readable storage medium of claim 10, wherein the SGSN is connected to an Internet Packet Exchange (IPX) network or a Virtual Private Network (VPN).

18. The non-transitory computer-readable storage medium of claim 10, wherein connectivity between the IDR application and the GGSN is provided through an IPX network or a VPN using at least one public Internet Packet (IP) address assigned to the IDR application.

19. The non-transitory computer-readable storage medium of claim 10, wherein the IDR application uses an IP address of the SGSN to identify the first or the second set of values to be provided in the RAI and ULI IEs.

* * * * *